US011409337B2

(12) United States Patent
Kang et al.

(10) Patent No.: US 11,409,337 B2
(45) Date of Patent: Aug. 9, 2022

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR); Sungmo Im, Seoul (KR); Sangmin Kim, Seoul (KR); Hodong Hwang, Seoul (KR); Haknyun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 16/993,629

(22) Filed: Aug. 14, 2020

(65) Prior Publication Data

US 2021/0048857 A1  Feb. 18, 2021

(30) Foreign Application Priority Data

Aug. 16, 2019  (KR) .................. 10-2019-0100106

(51) Int. Cl.
*G02F 1/1333* (2006.01)
*G06F 1/18* (2006.01)
*F16M 11/04* (2006.01)
*G06F 1/16* (2006.01)

(52) U.S. Cl.
CPC ............. *G06F 1/181* (2013.01); *F16M 11/04* (2013.01); *G06F 1/1607* (2013.01)

(58) Field of Classification Search
CPC ....... G06F 1/181; G06F 1/1607; F16M 11/04; H05K 7/1427; G02F 1/133308; B23K 26/22; F16B 5/08

USPC ..................................................... 361/679.02
See application file for complete search history.

(56) References Cited

U.S. PATENT DOCUMENTS

2006/0096957 A1* 5/2006 Pfiz .................. B23K 26/22
219/121.63
2014/0377578 A1* 12/2014 Hisada .................. B23K 26/32
428/594
2017/0118859 A1* 4/2017 Kang ................ G02F 1/133385

FOREIGN PATENT DOCUMENTS

| JP | 2001276991 | | 10/2001 |
|---|---|---|---|
| JP | 2006315062 | | 11/2006 |
| JP | 2006315062 A | * | 11/2006 |
| JP | 2010217243 | | 9/2010 |
| JP | 2018001245 | | 1/2018 |
| KR | 101282125 | | 6/2013 |
| KR | 1020190064114 | | 10/2019 |

OTHER PUBLICATIONS

PCT International Application No. PCT/KR2020/010713, Search Report dated Nov. 25, 2020, 3 pages.

(Continued)

*Primary Examiner* — Seokjin Kim
*Assistant Examiner* — Gage Crum
(74) *Attorney, Agent, or Firm* — Lee Hong Degerman Kang & Waimey

(57) ABSTRACT

A display device is disclosed. The display device includes a display panel, a main frame located at the rear of the display panel, and an inner plate located between the display panel and the main frame, the display panel being coupled to the inner plate, wherein the inner plate includes a coupling area depressed from the inner plate to the main frame by pressing, and the inner plate and the main frame are coupled to each other at the coupling area by welding.

9 Claims, 23 Drawing Sheets

(56) References Cited

OTHER PUBLICATIONS

Korean Intellectual Property Office Application No. 10-2019-0100106, Notice of Allowance dated Sep. 8, 2020, 2 pages.
Intellectual Property Office of India Application Serial No. 202034034694, Office Action dated Sep. 10, 2021, 6 page.

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2019-0100106, filed on Aug. 16, 2019, the contents of which are all incorporated by reference herein in its entirety.

BACKGROUND OF THE INVENTION

1. Field of the Invention

The present disclosure relates to a display device.

2. Description of the Related Art

As the information society has developed, the demand for display devices is increasing in various forms, and accordingly, in recent years, various display devices such as a liquid crystal display (LCD), plasma display panel (PDP), electroluminescent display (ELD), vacuum fluorescent display (VFD), organic light emitting diode (OLED), and the like have been studied and used.

Thereamong, a display device using an organic light emitting diode (OLED) has excellent luminance and viewing angle characteristics in comparison with a liquid crystal display device and does not require a backlight unit, thereby being implemented in an ultrathin type.

In recent years, much research has been conducted on the structure of such a display device.

SUMMARY OF THE INVENTION

It is an object of the present disclosure to solve the above and other problems.

It is another object of the present disclosure to provide a structure capable of securing rigidity of an ultrathin large-screen display device.

It is another object of the present disclosure to provide a structure capable of improving heat dissipation of the ultrathin large-screen display device.

It is a further object of the present disclosure to improve productivity of the ultrathin large-screen display device.

In accordance with an aspect of the present disclosure, the above and other objects can be accomplished by the provision of a display device including a display panel, a main frame located at the rear of the display panel, and an inner plate located between the display panel and the main frame, the display panel being coupled to the inner plate, wherein the inner plate includes a coupling area depressed from the inner plate to the main frame by pressing, and the inner plate and the main frame are coupled to each other at the coupling area by welding.

In accordance with another aspect of the present disclosure, the coupling area may include a welding portion having a first step formed by pressing the inner plate and a support portion having a second step formed together with the welding portion by pressing the inner plate, the support portion may contact the main frame, and the welding portion and the main frame may be welded to form a conjunction portion.

In accordance with another aspect of the present disclosure, the display device may further include a first gap formed between the welding portion and the main frame, wherein the conjunction portion may connect the welding portion of the inner plate and the main frame to each other in the first gap.

In accordance with another aspect of the present disclosure, the conjunction portion may be formed within about 40% of the thickness of the main frame.

In accordance with another aspect of the present disclosure, the coupling area may further include an adhesive portion having a third step formed by pressing the inner plate, and the welding portion may form the first step together with the adhesive portion.

In accordance with another aspect of the present disclosure, the display device may further include an adhesive member fixed to the adhesive portion, the display panel being adhered to the adhesive member.

In accordance with another aspect of the present disclosure, the display device may further include a second gap formed between the adhesive member and the welding portion, wherein the upper end of the conjunction portion may protrude from the welding portion so as to be formed in the second gap.

In accordance with another aspect of the present disclosure, the inner plate may further include a heat dissipation portion configured to form a third gap together with the display panel, and the third gap may be less than the thickness of the adhesive member.

In accordance with another aspect of the present disclosure, the coupling area may have a circular shape, the conjunction portion may include a first conjunction portion located at the upper side of the welding portion, a second conjunction portion located at the left side of the welding portion, and a third conjunction portion located at the right side of the welding portion, and the distance between the second conjunction portion and the third conjunction portion may be greater than the distance between the first conjunction portion and the second conjunction portion or the distance between the first conjunction portion and the third conjunction portion.

In accordance with another aspect of the present disclosure, the coupling area may have a circular shape, the conjunction portion may include a first conjunction portion located at the upper side of the welding portion, a second conjunction portion located at the left upper side of the welding portion, a third conjunction portion located at the left lower side of the welding portion, a fourth conjunction portion located at the right lower side of the welding portion, and a fifth conjunction portion located at the right upper side of the welding portion, the distance between the third conjunction portion and the fourth conjunction portion may be greater than the distance between the first conjunction portion and the second conjunction portion or the distance between the fifth conjunction portion and the first conjunction portion, the distance between the first conjunction portion and the second conjunction portion may be greater than the distance between the second conjunction portion and the third conjunction portion, and the distance between the fifth conjunction portion and the first conjunction portion may be greater than the distance between the fourth conjunction portion and the fifth conjunction portion.

In accordance with another aspect of the present disclosure, the coupling area may have a circular shape, the conjunction portion may include a plurality of conjunction portions, and the plurality of conjunction portions may be irregularly distributed in the welding portion, the plurality of conjunction portions being distributed so as to spread long leftwards and rightwards.

In accordance with a further aspect of the present disclosure, the coupling area may have a circular shape, the conjunction portion may include a first conjunction portion located at the left side of the welding portion and a second conjunction portion located at the right side of the welding portion, and the first conjunction portion and the second conjunction portion may be located so as to be spaced apart from each other in the leftward-rightward direction of the main frame, the first conjunction portion and the second conjunction portion being opposite each other with respect to the support portion.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Hereinafter, an organic light emitting diode (OLED) panel will be described by way of example as a display panel; however, a display panel applicable to the present disclosure is not limited to the OLED panel, and a plasma display panel (PDP), a field emission display (FED) panel, or a liquid crystal display (LCD) panel may also be used.

Figure 1:
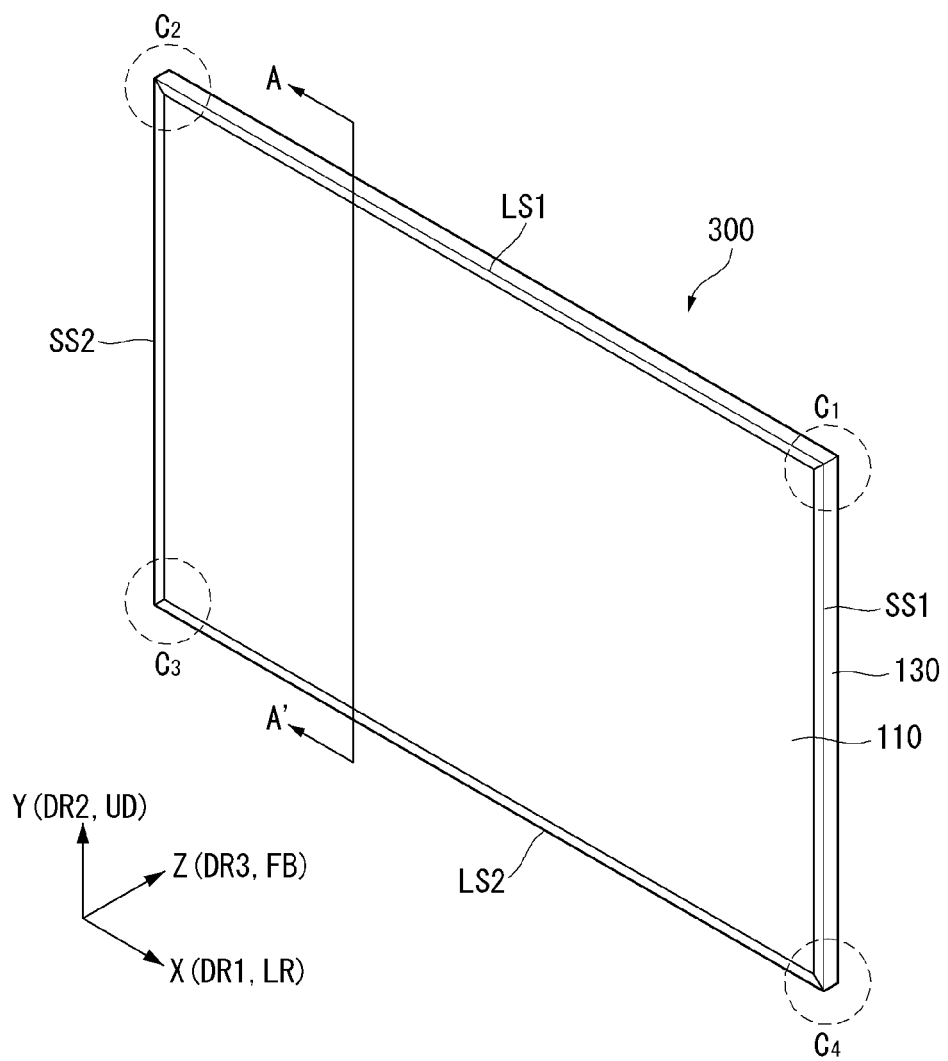
FIGS. 1 to 23 are views showing examples of a display device according to embodiments of the present disclosure.

Referring to FIG. 1, a display device 300 may include a first long side LS1, a second long side LS2 opposite the first long side LS1, a first short side SS1 adjacent to the first long side LS1 and the second long side LS2, and a second short side SS2 opposite the first short side SS1.

The first short side area SS1 of the display device 300 may be referred to as a first side area, and the second short side area SS2 of the display device 300 may be referred to as a second side area. The first long side area LS1 of the display device 300 may be referred to as a third side area adjacent to the first side area and the second side area and located between the first side area and the second side area, and the second long side area LS2 of the display device 300 may be referred to as a fourth side area adjacent to the first side area and the second side area, located between the first side area and the second side area, and opposite the third side area.

Although the length of the first and second long sides LS1 and LS2 is shown and described as being greater than the length of the first and second short sides SS1 and SS2 for convenience of description, the length of the first and second long sides LS1 and LS2 may be approximately equal to the length of the first and second short sides SS1 and SS2.

In the following description, a first direction DR1 may be a direction parallel to the long sides LS1 and LS2 of a display panel 110, and a second direction DR2 may be a direction parallel to the short sides SS1 and SS2 of the display panel 110. A third direction DR3 may be a direction perpendicular to the first direction DR1 and/or the second direction DR2.

The side of the display device 300 at which an image is displayed may be referred to as a front or a front surface. The side of the display device 300 at which an image is not observed when the display device 300 displays the image may be referred to as a rear or a rear surface. When the display device 300 is seen from the front or the front surface, the first long side portion LS1 may be referred to as an upper side or an upper surface, and the second long side portion LS2 may be referred to as a lower side or a lower surface. When the display device 300 is seen from the front or the front surface, the first short side portion SS1 may be referred to as a right side or a right surface, and the second short side portion SS2 may be referred to as a left side or a left surface.

The first long side LS1, the second long side LS2, the first short side SS1, and the second short side SS2 may be referred to as edges of the display device 300. In addition, the points at which the first long side LS1, the second long side LS2, the first short side SS1, and the second short side SS2 join may be referred to as corners. For example, the point at which the first long side LS1 and the first short side SS1 join may be referred to as a first corner C1, the point at which the first long side LS1 and the second short side SS2 join may be referred to as a second corner C2, the point at which the second short side SS2 and the second long side LS2 join may be referred to as a third corner C3, and the point at which the second long side LS2 and the first short side SS1 join may be referred to as a first corner C4.

A direction from the first short side SS1 to the second short side SS2 or a direction from the second short side SS2 to the first short side SS1 may be referred to as a leftward-rightward direction LR or a horizontal direction DR1. A direction from the first long side LS1 to the second long side LS2 or a direction from the second long side LS2 to the first long side LS1 may be referred to as an upward-downward direction UD or a vertical direction DR2.

In addition, a direction from the front surface to the rear surface or a direction from the rear surface to the front surface may be referred to as a forward-rearward direction DR3 or a thickness direction FB. The forward-rearward direction DR3 may be a direction perpendicular to the leftward-rightward direction DR1 and/or the upward-downward direction DR2.

Figure 2:
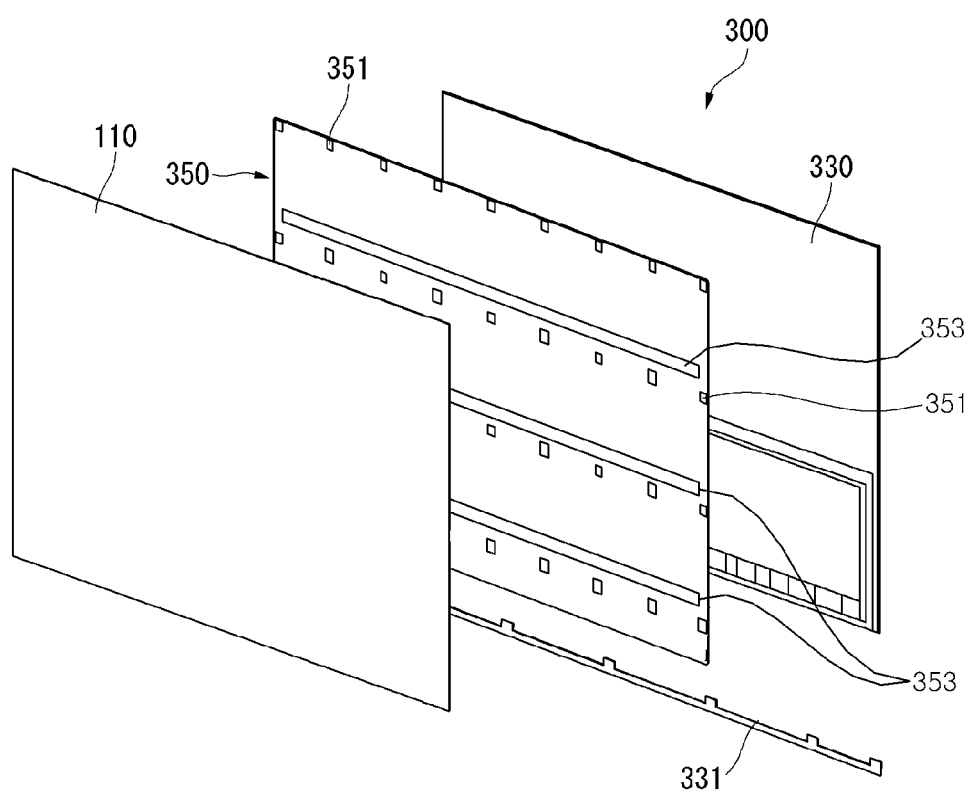
Figure 3:
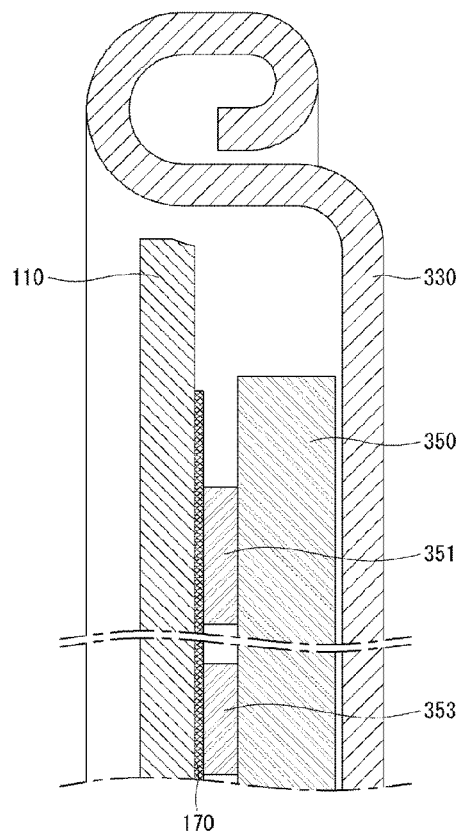
Figure 4:
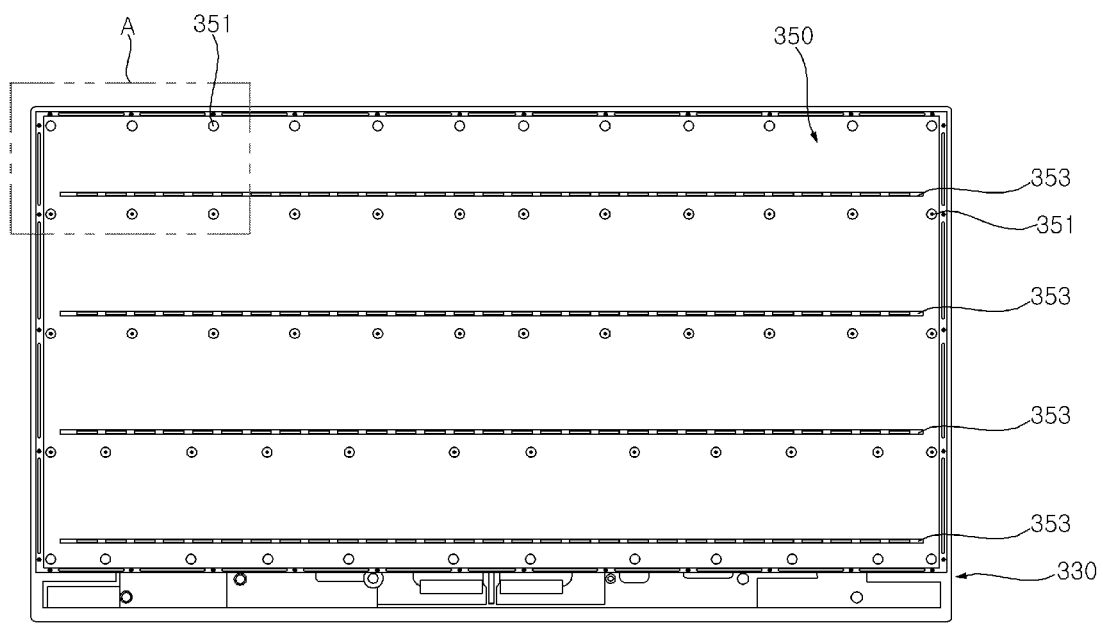

Referring to FIGS. 2 to 4, the display device 300 may include a display panel 110, a main frame 330, and an inner plate 350.

The display panel 100 may be provided at the front surface of the display device 300, and may display an image.

The main frame 330 may be disposed at the rear of the display panel 110. The main frame 330 may be coupled to the display panel 110. The edge of the main frame 330 may be bent at least once.

The main frame 330 may include a bottom frame 331. The bottom frame 331 may be disposed at the lower end of the main frame 330. The bottom frame 331 may be separated from or coupled to the main frame 330. The main frame 330 and the bottom frame 331 may cover the lower surface of the display panel 110.

The inner plate 350 may be disposed at the rear of the display panel 110. The inner plate 350 may be disposed between the display panel 110 and the main frame 330. The front surface of the inner plate 350 may face the display panel 110. The rear front surface of the inner plate 350 may be fixed or coupled to the main frame 330.

The inner plate 350 may face a support plate 170 mounted to the rear surface of the display panel 110. The inner plate 350 may be connected or coupled to the support plate 170 via a coupling member 351 and 353.

Coupling portions 351 may be distributed in the inner plate 350. The coupling portions 351 may be uniformly distributed over the entire area of the inner plate 350. The coupling portions 351 may be provided for coupling between the inner plate 350 and the main frame 330.

Adhesive members 353 may be disposed on the front area of the inner plate 350. The adhesive members 353 may be disposed between the coupling portions 351. For example, each of the adhesive members 353 may be double-sided tape.

A plurality of coupling portions 351 may be disposed in the inner plate 350 in M columns and N rows (M and N being natural numbers).

A plurality of adhesive members 353 may be disposed long in the horizontal direction of the inner plate 350. The plurality of adhesive members 353 may be spaced apart from each other in the vertical direction.

Figure 5:
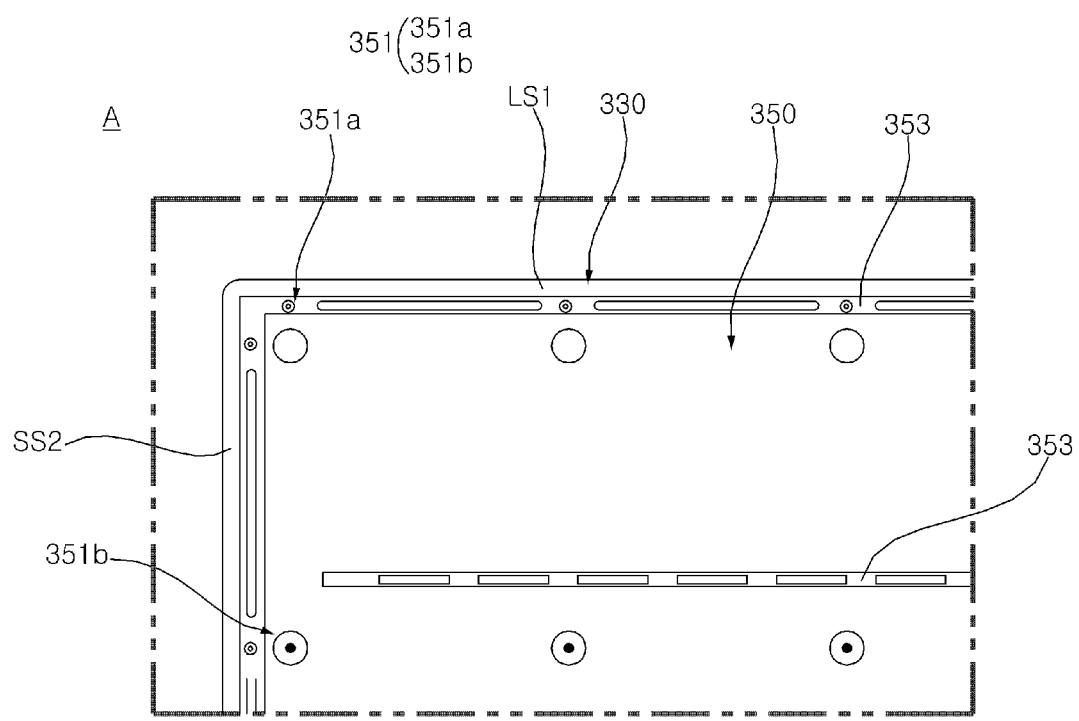
Figure 6:
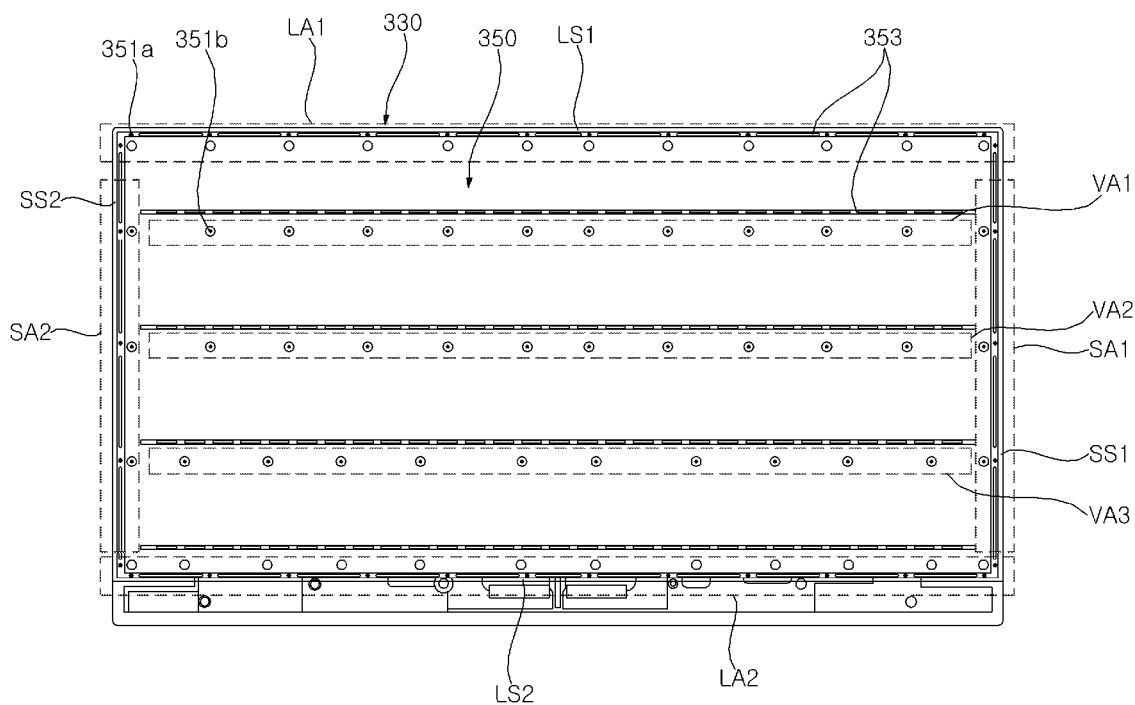

Referring to FIGS. 5 and 6, the inner plate 350 may be located on the front surface of the main frame 330, and the inner plate 350 may be coupled to the main frame 330 by welding. The main frame 330 and the inner plate 350 may be metal. For example, the main frame 330 and/or the inner plate 350 may be steel, and welding may be performed using a laser.

A coupling area 351 may include a first coupling area 351a and a second coupling area 351b. The first coupling area 351a may be disposed along contour sides of the inner plate 350 while being adjacent to the contour of the inner plate 350. The second coupling area 351b may be disposed on the inner plate 350 inside the first coupling area 351a.

For example, the inner plate 350 may include a first long side area LA1, a second long side area LA2, a first short side area SA1, and a second short side area SA2. The first long side area LA1 may be located adjacent to the first long side LS1 of the inner plate 350. The second long side area LA2 may be located adjacent to the second long side LS2 of the inner plate 350. The first short side area SA1 may be located adjacent to the first short side SS1 of the inner plate 350. The second short side area SA2 may be located adjacent to the second short side SS2 of the inner plate 350.

In another example, the inner plate 350 may include a first horizontal area VA1, a second horizontal area VA2, and a third horizontal area VA3. The first horizontal area VA1 may be adjacent to the first long side LS1, and may be located between the first long side LS1 and the second long side LS2. The third horizontal area VA3 may be adjacent to the second long side LS2, and may be located between the first long side LS1 and the second long side LS2. The second horizontal area VA2 may be located between the first horizontal area VA1 and the third horizontal area VA3.

A plurality of first coupling areas 351a may be disposed at the first long side area LA1, the second long side area LA2, the first short side area SA1, and/or the second short side area SA2. For example, the plurality of first coupling areas 351a may be sequentially disposed at the first long side area LA1 in the longitudinal direction of the first long side LS1. The adhesive members 353 may be located at the first long side area LA1, the second long side area LA2, the first short side area SA1, and/or the second short side area SA2. For example, the adhesive members 353 may overlap the plurality of first coupling areas 351a.

A plurality of second coupling areas 351b may be disposed at the first horizontal area VA1, the second horizontal area VA2, and/or the third horizontal area VA3. For example, the plurality of second coupling areas 351b may be sequentially disposed at the first horizontal area VA1 in the longitudinal direction of the first long side LS1. At this time, the plurality of second coupling areas 351b may be located neighboring the adhesive members 353.

Figure 7:
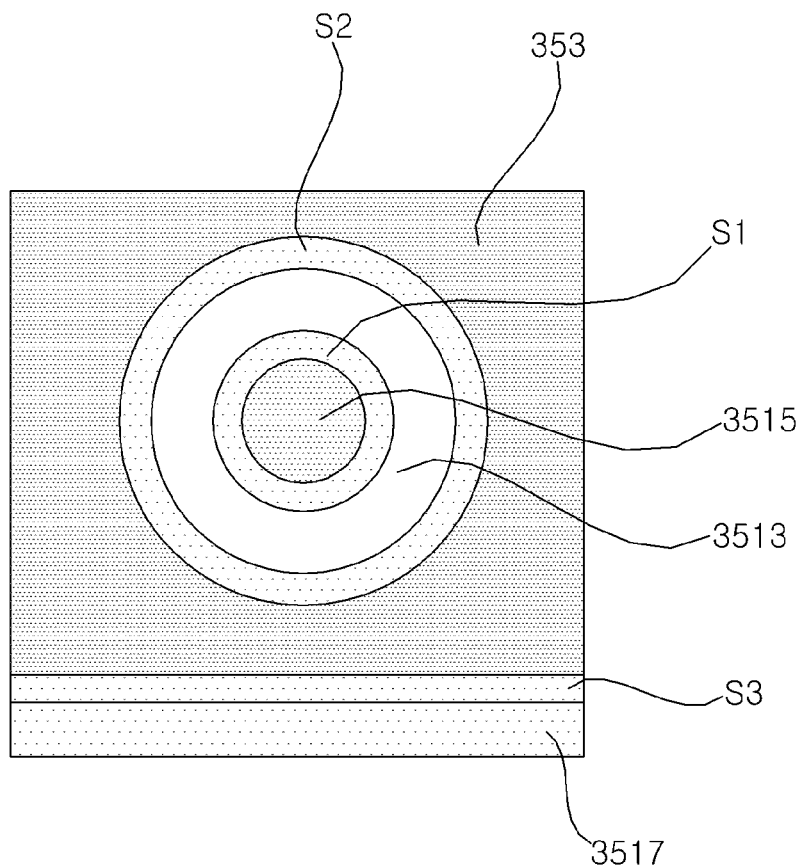
Figure 8:
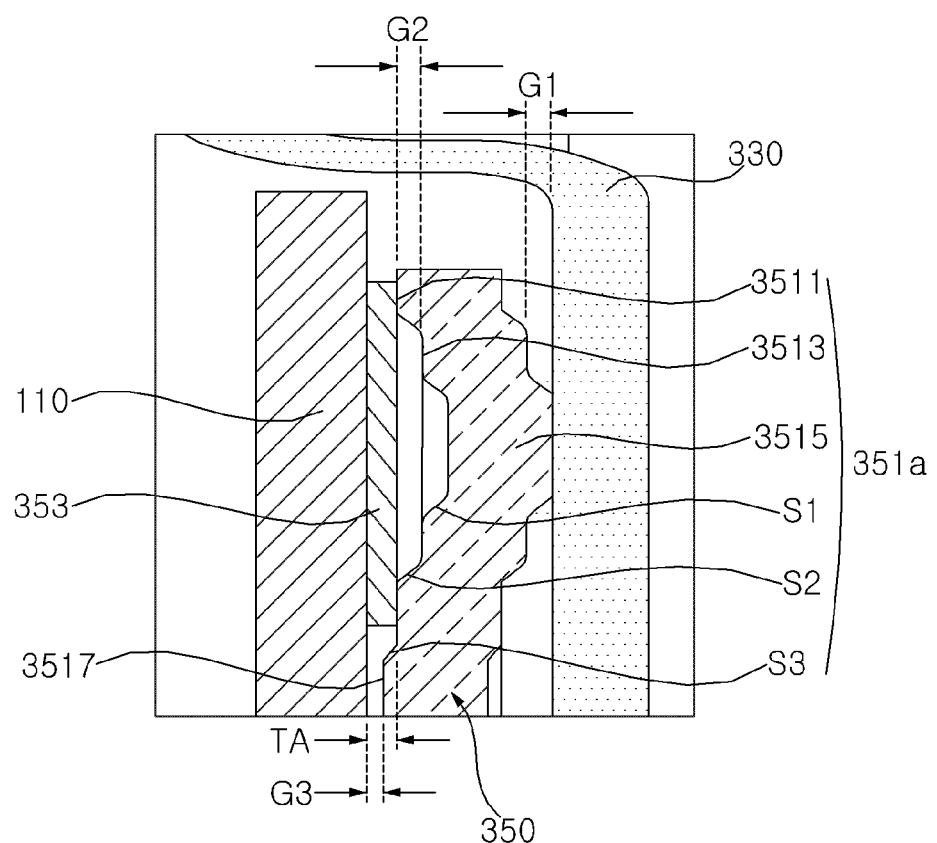

Referring to FIGS. 7 and 8, the first coupling area 351a may form steps S1, S2, and S3 when the inner plate 350 is pressed. The first coupling area 351a may include an adhesive portion 3511, a welding portion 3513, and a support portion 3515. The adhesive portion 3511, the welding portion 3513, and the support portion 3515 may be formed in a multistep shape when the inner plate 350 is pressed. The welding portion 3513 may be referred to as a portion 3513 to be welded.

The adhesive portion 3511 may form the outermost contour of the first coupling area 351a, the welding portion 3513 may be located inside the adhesive portion 3511, and the support portion 3515 may be located inside the welding portion 3513 and may form the central part of the first coupling area 351a. For example, the first coupling area 351a may generally have a circular shape.

The main frame 330 may support the support portion 3515. The front surface of the main frame 330 may contact the rear surface of the support portion 3515. The welding portion 3513 may form the step S1 at the contour of the support portion 3515 together with the support portion 3515, and may extend from the support portion 3515. A first gap G1 may be formed between the welding portion 3513 and the main frame 330. The first gap G1 may provide a space into which gas generated when a laser is applied to the welding portion 3513 and the welding portion 3513 is melted may escape. Consequently, the welding portion 3513 may be melted and introduced into the main frame 330 without impure gas, whereby welding quality may be improved.

The adhesive portion 3511 may form the step S2 at the contour of the welding portion 3513 together with the welding portion 3513, and may extend from the welding portion 3513. The adhesive member 353 may be fixed to the adhesive portion 3511. The adhesive member 353 may cover the welding portion 3513. A second gap G2 may be formed between the adhesive member 353 and the welding portion 3513. Consequently, a protruding shape of the welding portion 3513 that may be formed as the result of melting of the welding portion 3513 at the time of welding may be received in the second gap, whereby the display panel 110 may be evenly coupled to the inner plate 350 via the adhesive member 353.

The inner plate 350 may include a heat dissipation portion 3517. The heat dissipation portion 3517 may form the step S3 at the contour of the adhesive portion 3511 together with the adhesive portion 3511, and may extend from the adhesive portion 3511. A third gap G3 may be formed between the heat dissipation portion 3517 and the display panel 110. The third gap G3 may be less than the thickness TA of the adhesive member 353. Consequently, heat generated by the display panel 110 may be effectively transmitted to the heat dissipation portion 3517 of the inner plate 350, whereby dissipation of heat from the display panel 110 may be effectively achieved.

Figure 9:
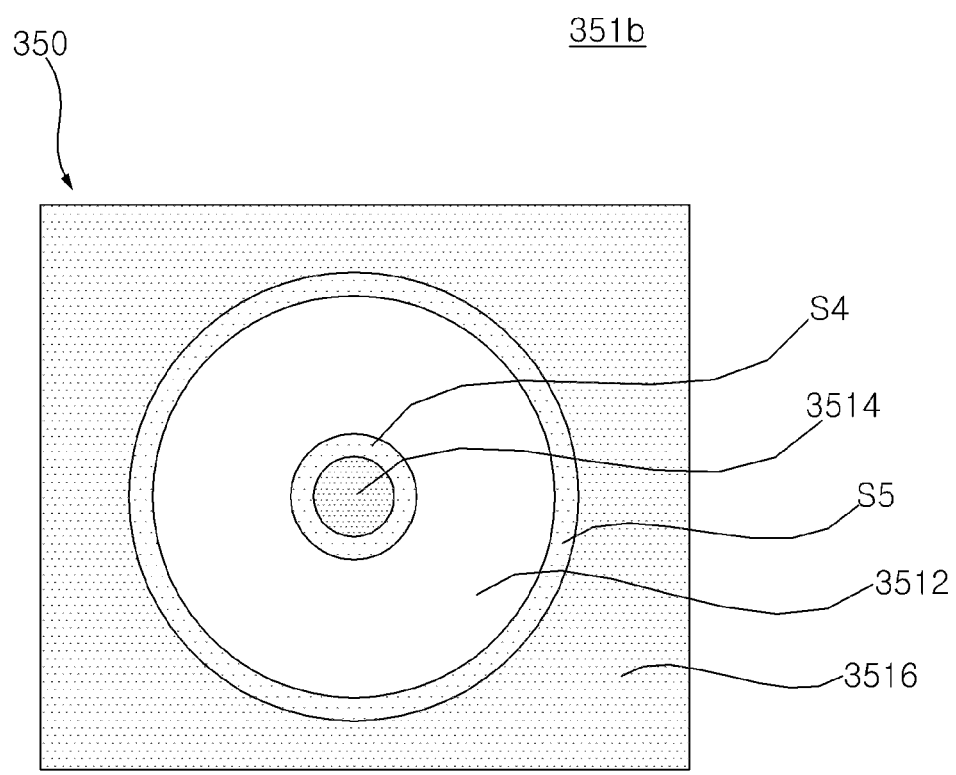
Figure 10:
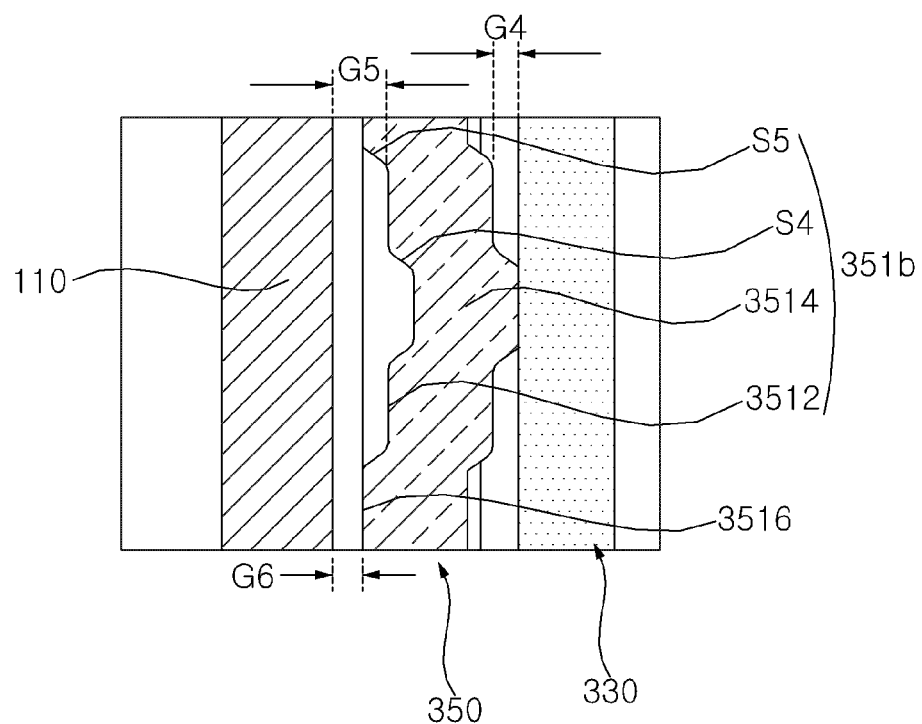

Referring to FIGS. 9 and 10, the second coupling area 351b may form steps S4 and S5 when the inner plate 350 is pressed. The second coupling area 351b may include a welding portion 3512 and a support portion 3514. The welding portion 3512 and the support portion 3514 may be formed in a multistep shape when the inner plate 350 is pressed.

The welding portion 3512 may form the outermost contour of the second coupling area 351b, and the support portion 3514 may be located inside the welding portion 3512 and may form the central part of the second coupling area 351b. For example, the second coupling area 351b may generally have a circular shape.

The main frame 330 may support the support portion 3514. The front surface of the main frame 330 may contact the rear surface of the support portion 3514. The welding portion 3512 may form the step S4 at the contour of the support portion 3514 together with the support portion 3514, and may extend from the support portion 3514. A fourth gap G4 may be formed between the welding portion 3512 and the main frame 330. The fourth gap G4 may provide a space into which gas generated when a laser is applied to the welding portion 3512 and the welding portion 3512 is melted may escape. Consequently, the welding portion 3512 may be melted and introduced into the main frame 330 without impure gas, whereby welding quality may be improved.

A fifth gap G5 may be formed between the display panel 110 and the welding portion 3512. Consequently, a protruding shape of the welding portion 3512 that may be formed as the result of melting of the welding portion 3512 at the time of welding may be received in the fifth gap, whereby the display panel 110 may be evenly located on the inner plate 350.

The inner plate 350 may include a heat dissipation portion 3516. The heat dissipation portion 3516 may form the step S5 at the contour of the welding portion 3512 together with the welding portion 3512, and may extend from the welding portion 3512. A sixth gap G6 may be formed between the heat dissipation portion 3516 and the display panel 110. The sixth gap G6 may be less than the distance G5 between the welding portion 3512 and the display panel 110. Consequently, heat generated by the display panel 110 may be effectively transmitted to the heat dissipation portion 3516 of the inner plate 350, whereby dissipation of heat from the display panel 110 may be effectively achieved.

Figure 11:
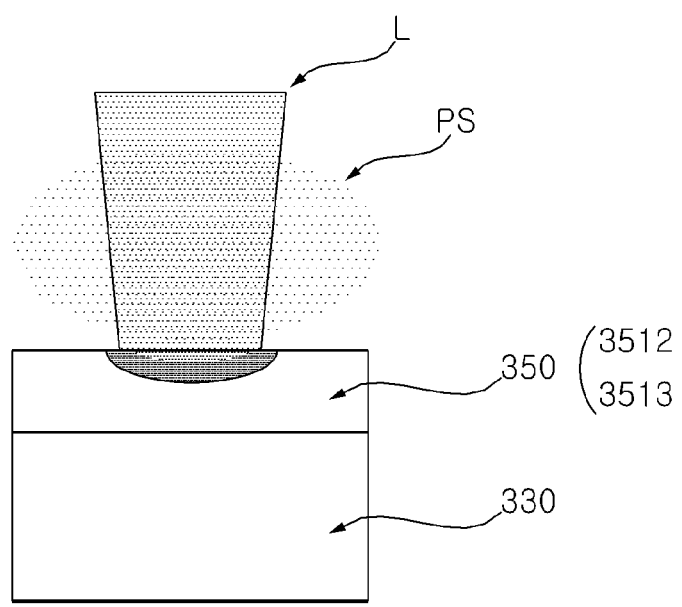
Figure 12:
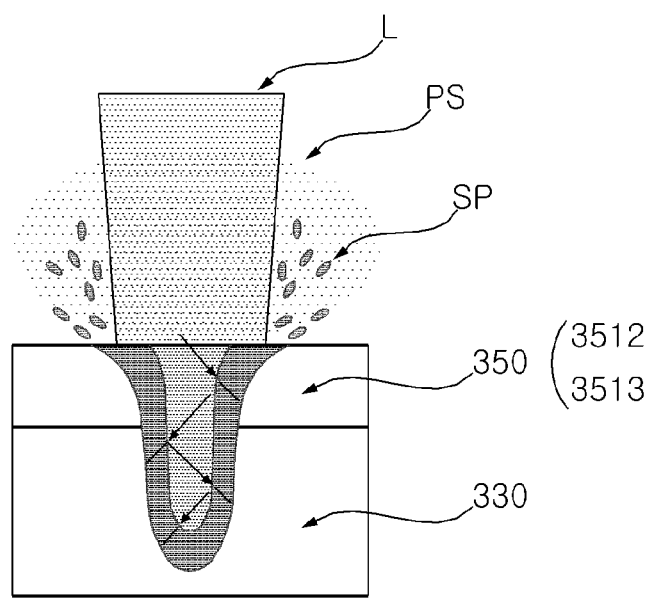
Figure 13:
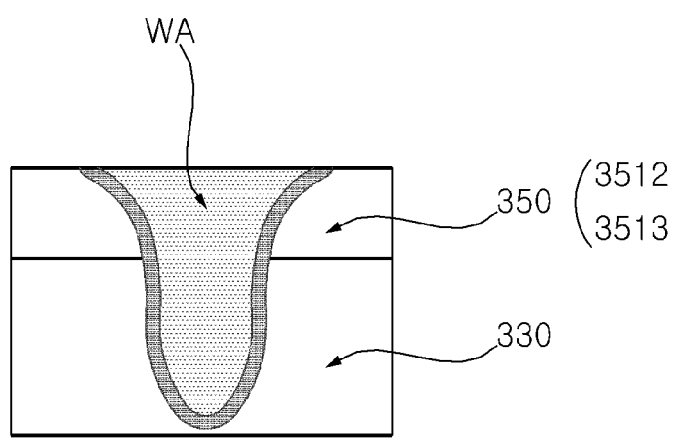

Referring to FIGS. 11 to 13, a laser L may be applied to the front surface of the inner plate 350. For example, the front surface of the inner plate 350 may be the welding portion 3512, 3513. When the laser L is applied, the welding portion 3512, 3513 may be heated, whereby plasma PS may be formed in front of the inner plate 350 (see FIG. 11). When the welding portion 3512, 3513 of the inner plate 350 is melted, the main frame 330 may also be heated and melted. At this time, metal sputters SP may be dispersed in front of the inner plate 350, in addition to the plasma PS. The laser L may be reflected by the molten surface of the welding portion 3512, 3513 or may be absorbed by the molten surfaces thereof (see FIG. 12). When application of the laser L is completed, a molten portion WA of the welding portion 3512, 3513 and the main frame 330 may be solidified, whereby the inner plate 350 and the main frame 330 may be securely coupled to each other (see FIG. 13). The solidified molten portion WA may be referred to as a conjunction portion WA or a bead WA.

Figure 14:
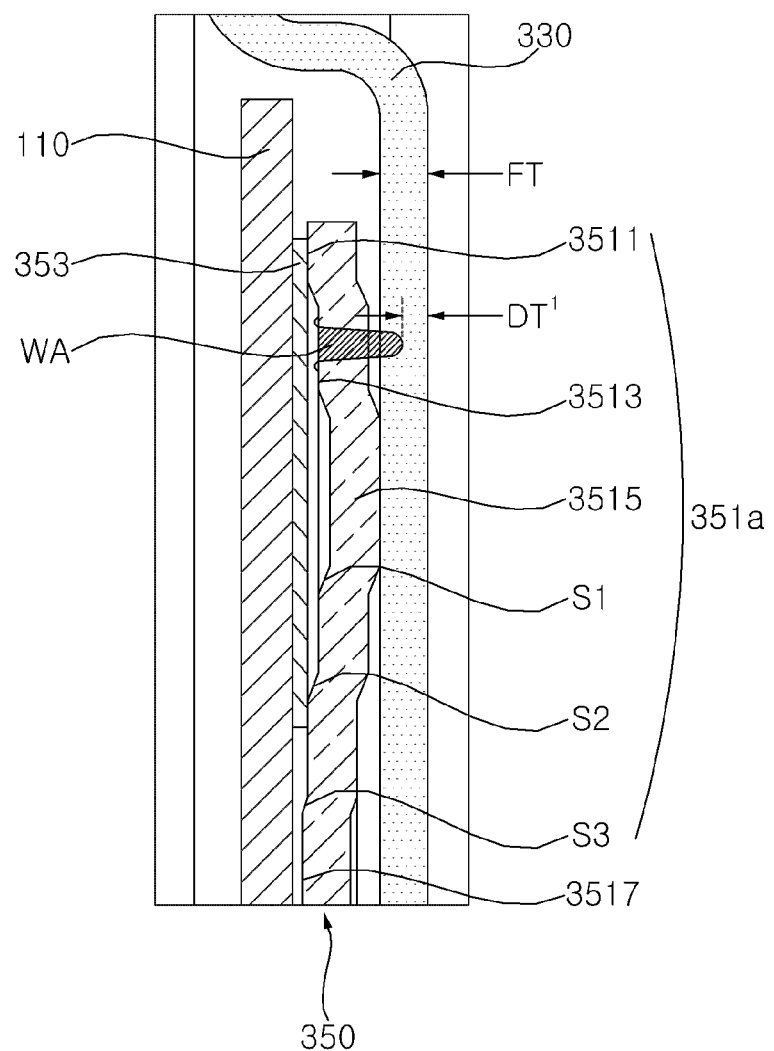
Figure 15:
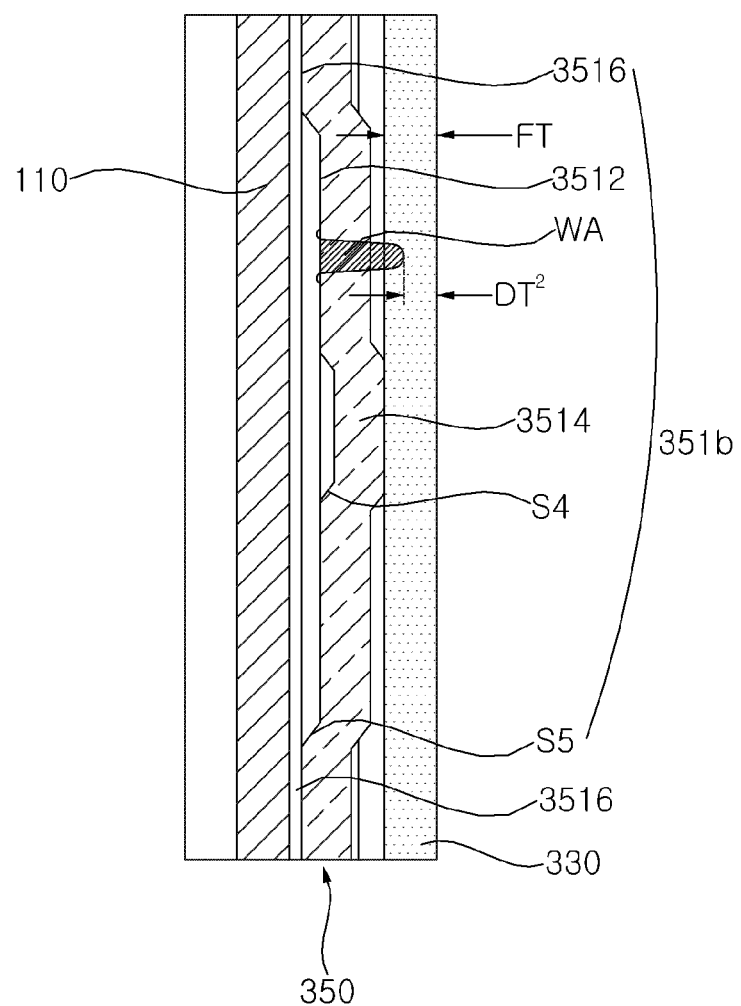

Referring to FIGS. 14 and 15, the conjunction portion WA may be formed at a portion of the interior of the welding portion 3512, 3513 of the inner plate 350 and the main frame 330. The conjunction portion WA formed in the welding portion 3512, 3513 of the inner plate 350 may be formed over the entire thickness of the inner plate 350. The conjunction portion WA formed in the main frame 330 may be formed over a portion of the thickness of the main frame 330. The depth of the conjunction portion WA formed in the main frame 330 may be referred to as a penetration depth.

For example, the depth of the conjunction portion WA formed in the main frame 330 may be formed within about 40% or less of the thickness FT of the main frame 330. The remaining thickness DT1, DT2 of the main frame 330 excluding the conjunction portion WA may be 60% or more of the entire thickness of the main frame 330.

Consequently, coupling between the inner plate 350 and the main frame 330 may be securely achieved, and damage to the rear surface of the main frame 330 due to laser welding may be prevented.

Figure 16:
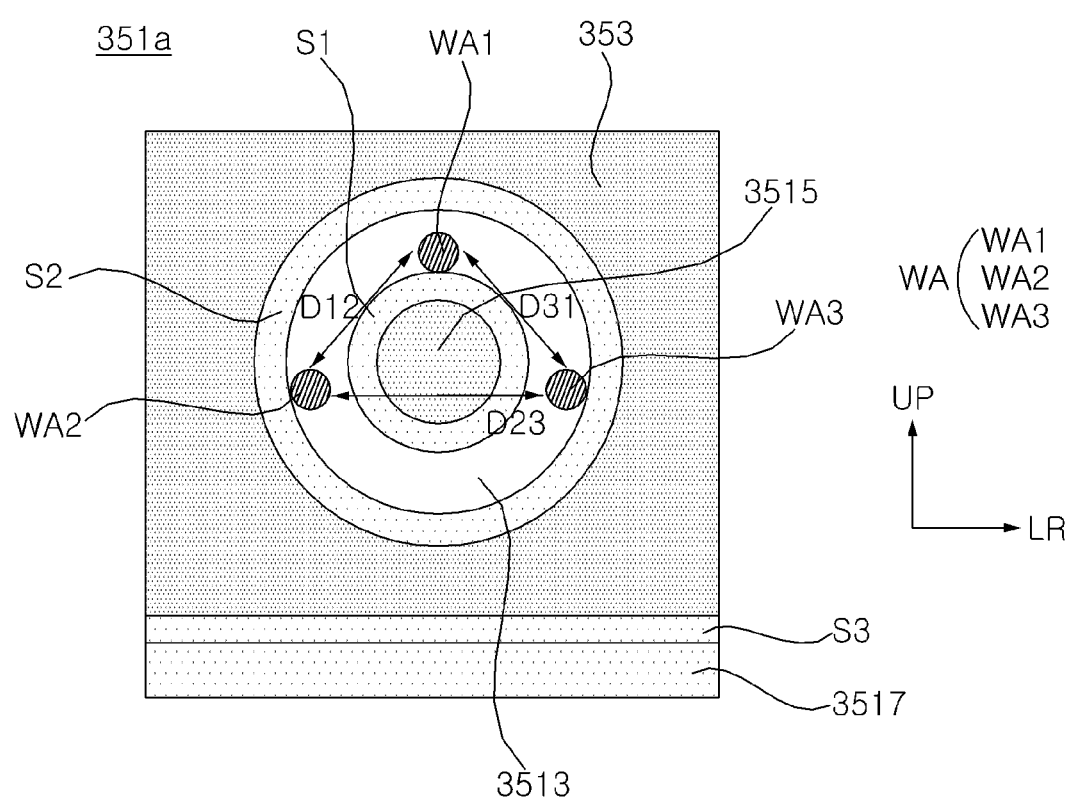
Figure 17:
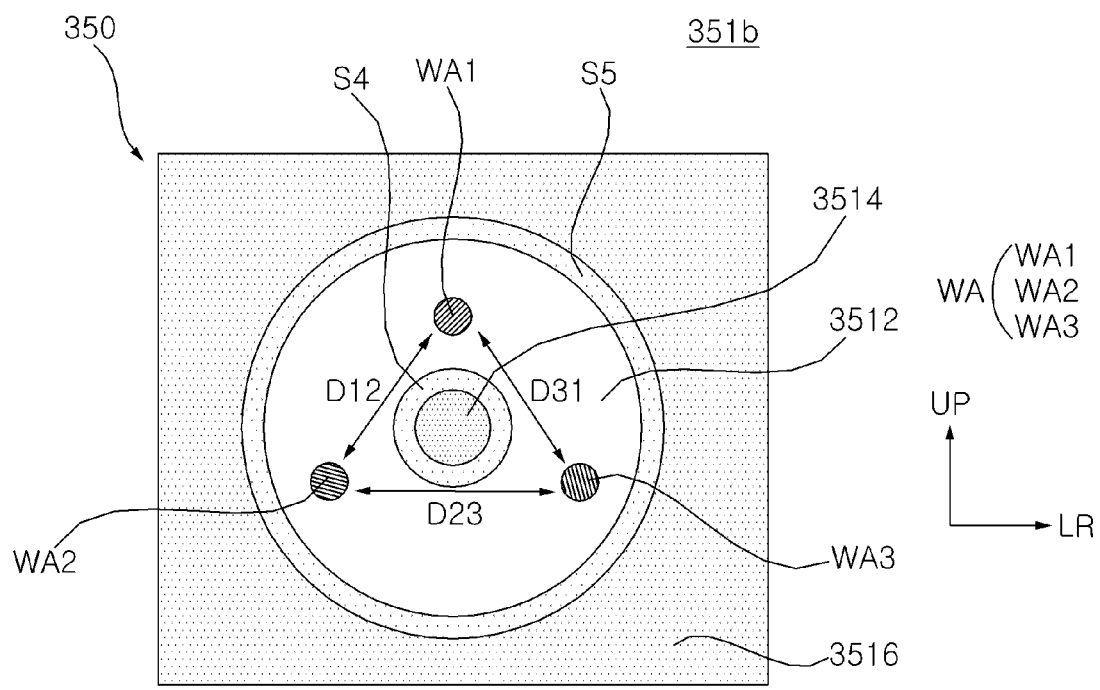

Referring to FIGS. 16 and 17, the conjunction portion WA may be disposed in the welding portion 3512, 3513. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

A plurality of conjunction portions WA may be provided. A first conjunction portion WA1 may be located at the upper side of the welding portion 3512, 3513, a second conjunction portion WA2 may be located at the left lower side of the welding portion 3512, 3513, and a third conjunction portion WA3 may be located at the right lower side of the welding portion 3512, 3513. The first conjunction portion WA1, the second conjunction portion WA2, and/or the third conjunction portion WA3 may generally form a triangle. The distance D23 between the second conjunction portion WA2 and the third conjunction portion WA3 may be greater than the distance D12 between the first conjunction portion WA1 and the second conjunction portion WA2 or the distance D31 between the first conjunction portion WA1 and the third conjunction portion WA3.

Consequently, rigidity of the display device against weight, twisting, drooping, etc. thereof may be secured.

Figure 18:
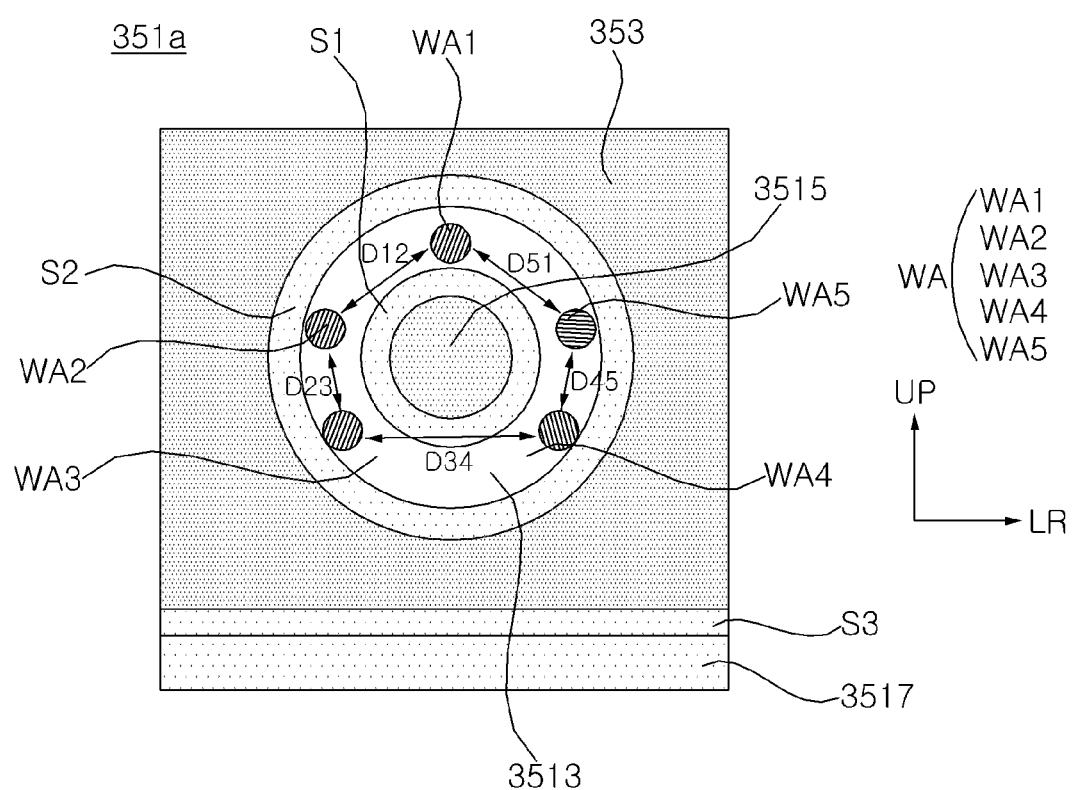
Figure 19:
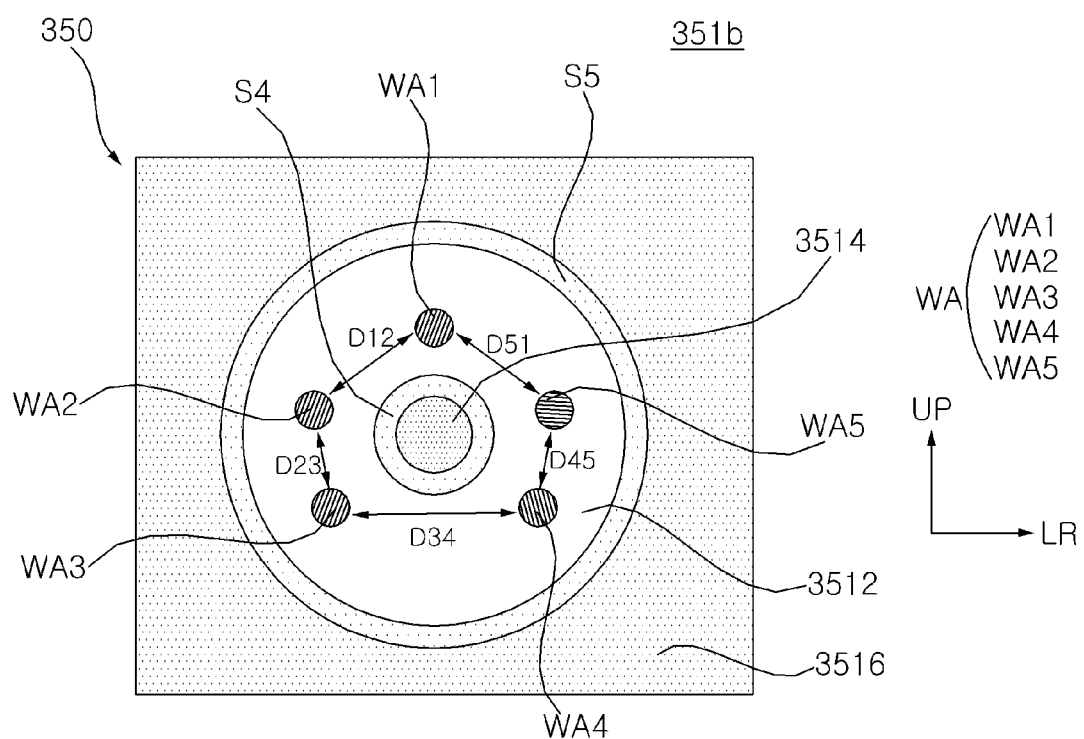

Referring to FIGS. 18 and 19, the conjunction portion WA may be disposed in the welding portion 3512, 3513. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

A plurality of conjunction portions WA may be provided. A first conjunction portion WA1 may be located at the upper side of the welding portion 3512, 3513, a second conjunction portion WA2 may be located at the left upper side of the welding portion 3512, 3513, and a third conjunction portion WA3 may be located at the left lower side of the welding portion 3512, 3513. A fourth conjunction portion WA4 may be located at the right lower side of the welding portion 3512, 3513, and a fifth conjunction portion WA5 may be located at the right upper side of the welding portion 3512, 3513.

The first conjunction portion WA1, the second conjunction portion WA2, the third conjunction portion WA3, the fourth conjunction portion WA4, and/or the fifth conjunction portion WA5 may generally form a pentagon. The distance D34 between the third conjunction portion WA3 and the fourth conjunction portion WA4 may be greater than the distance D12 between the first conjunction portion WA1 and the second conjunction portion WA2 or the distance D51 between the fifth conjunction portion WA5 and the first conjunction portion WA1. The distance D12 between the first conjunction portion WA1 and the second conjunction portion WA2 may be greater than the distance D23 between the second conjunction portion WA2 and the third conjunction portion WA3, and the distance D51 between the fifth conjunction portion WA5 and the first conjunction portion WA1 may be greater than the distance D45 between the fourth conjunction portion WA4 and the fifth conjunction portion WA5

Consequently, rigidity of the display device against weight, twisting, drooping, etc. thereof may be more effectively secured.

Figure 20:
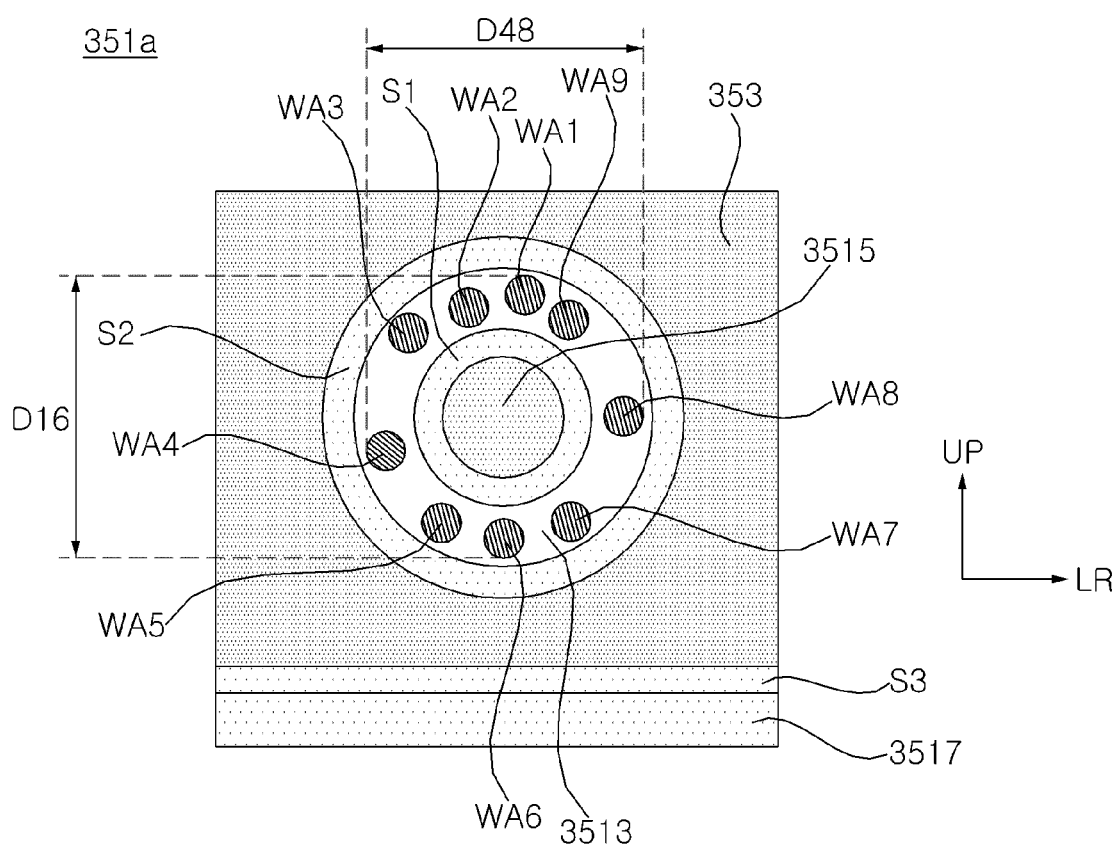

Referring to FIG. 20, the conjunction portion WA may be disposed in the welding portion 3513. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

Conjunction portions WA may be irregularly distributed in the welding portion 3513. The conjunction portions WA may be distributed so as to spread long leftwards and rightwards.

For example, the distance D16 between the uppermost conjunction portion WA1 and the lowermost conjunction portion WA6 in the welding portion 3513 may be less than the distance D48 between the leftmost conjunction portion WA4 and the rightmost conjunction portion WA8 in the welding portion 3513.

Consequently, rigidity of the display device against weight, twisting, drooping, etc. thereof may be more effectively secured.

Figure 21:
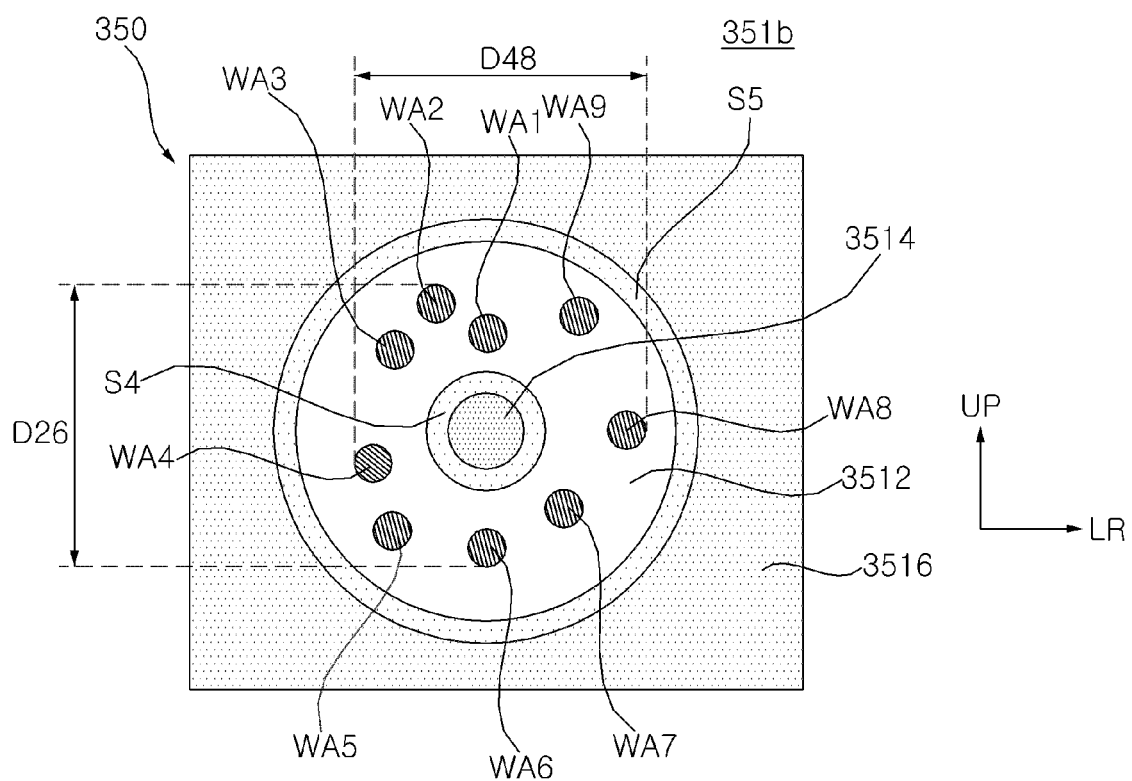

Referring to FIG. 21, the conjunction portion WA may be disposed in the welding portion 3512. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

Conjunction portions WA may be irregularly distributed in the welding portion 3512. The conjunction portions WA may be distributed so as to spread long leftwards and rightwards. For example, the distance D26 between the uppermost conjunction portion WA2 and the lowermost conjunction portion WA6 in the welding portion 3512 may be less than the distance D48 between the leftmost conjunction portion WA4 and the rightmost conjunction portion WA8 in the welding portion 3512.

Consequently, rigidity of the display device against weight, twisting, drooping, etc. thereof may be more effectively secured.

Figure 22:
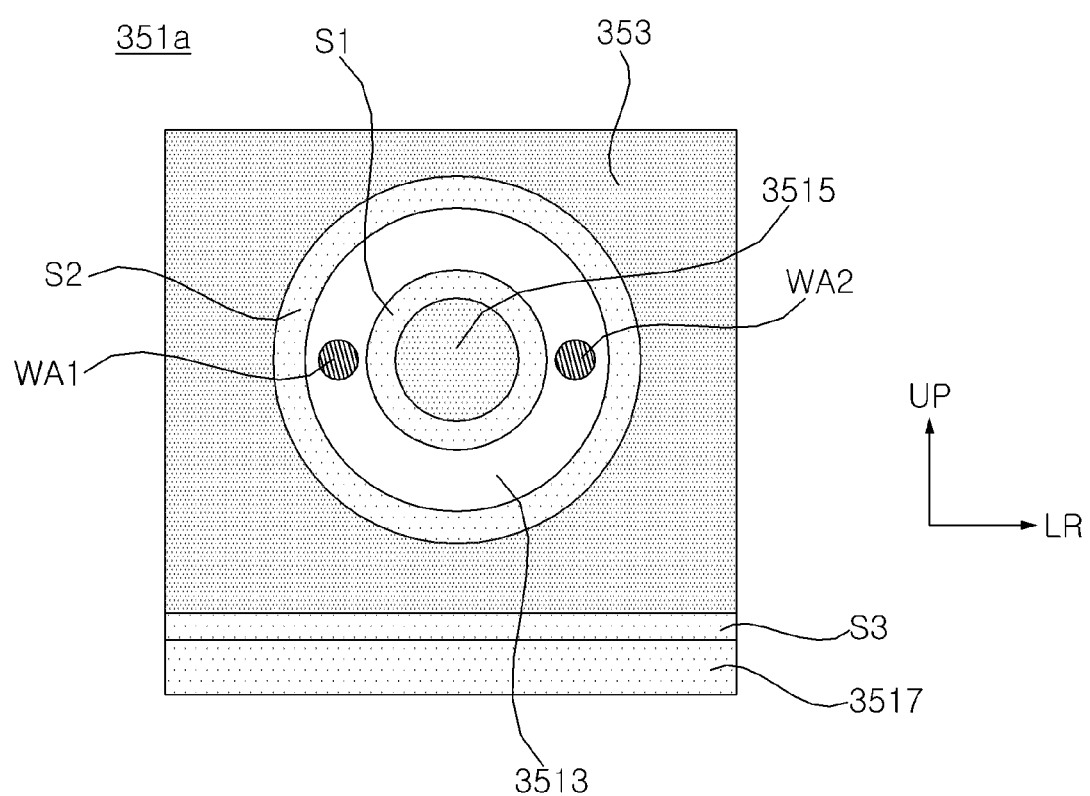

Referring to FIG. 22, the conjunction portion WA may be disposed in the welding portion 3513. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

A first conjunction portion WA1 may be located at the left side of the welding portion 3513, and a second conjunction portion WA2 may be located at the right side of the welding portion 3513. The first conjunction portion WA1 and the second conjunction portion WA2 may be located so as to be spaced apart from each other in the leftward-rightward direction LR of the main frame 330, and may be opposite each other with respect to the support portion 3515. For example, the first conjunction portion WA1, the support portion 3515, and the second conjunction portion WA2 may be arranged in a line.

Consequently, rigidity of the display device against weight, twisting, drooping, etc. thereof may be effectively secured.

Figure 23:
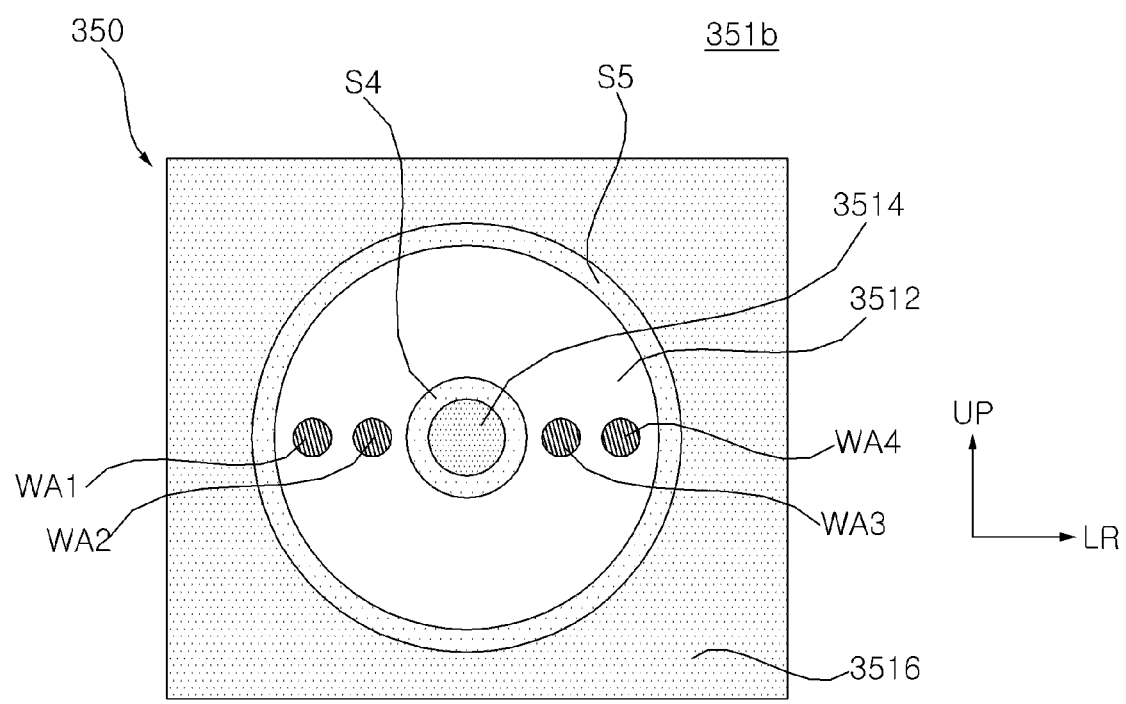

Referring to FIG. 23, the conjunction portion WA may be disposed in the welding portion 3512. In the case in which the length of the display device in the leftward-rightward direction LR is greater than the length of the display device in the upward-downward direction UD, force applied in the leftward-rightward direction LR of the main frame 330 may be greater than force applied in the upward-downward direction UD of the main frame 330.

A first conjunction portion WA1 may be located at the left side of the welding portion 3512, and a second conjunction portion WA2 may be located between the first conjunction portion WA1 and the support portion 3514. A fourth conjunction portion WA4 may be located at the right side of the welding portion 3512, and a third conjunction portion WA3 may be located between the fourth conjunction portion WA4 and the support portion 3514. The first conjunction portion WA1 and the second conjunction portion WA2 may be opposite the third conjunction portion WA3 and the fourth conjunction portion WA4 with respect to the support portion 3514. For example, the first conjunction portion WA1, the second conjunction portion WA2, the third conjunction portion WA3, and/or the fourth conjunction portion WA4 may be arranged in a line.

Consequently, rigidity of the display device against weight, twisting, drooping, etc. thereof may be effectively secured.

As is apparent from the above description, a display device according to the present disclosure has the following effects.

According to at least one of the embodiments of the present disclosure, it is possible to provide a structure capable of securing rigidity of an ultrathin large-screen display device.

According to at least one of the embodiments of the present disclosure, it is possible to provide a structure capable of improving heat dissipation of the ultrathin large-screen display device.

According to at least one of the embodiments of the present disclosure, it is possible to improve productivity of the ultrathin large-screen display device.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a main frame at a rear of the display panel;
an inner plate between the display panel and the main frame; and
an adhesive member fixing the display panel to the inner plate,
wherein the inner plate comprises a coupling area depressed from the inner plate toward the main frame,
wherein the coupling area comprises:
an adhesive portion stepped down by pressing the inner plate toward the main frame;
a welding portion stepped down from the adhesive portion toward the main frame by pressing; and
a support portion stepped down from the welding portion toward the main frame by pressing, the support portion in contact with the main frame,
wherein the welding portion and the main frame are welded to form a conjunction portion, and
wherein the adhesive member is fixed to the adhesive portion and the display panel is fixed to the adhesive member.

2. The display device according to claim 1, further comprising:
a first gap formed between the welding portion and the main frame, wherein
the conjunction portion connects the welding portion of the inner plate and the main frame to each other in the first gap.

3. The display device according to claim 2, wherein the conjunction portion is formed within about 40% of a thickness of the main frame.

4. The display device according to claim 1, further comprising:
a second gap formed between the adhesive member and the welding portion, wherein
an upper end of the conjunction portion protrudes from the welding portion so as to be formed in the second gap.

5. The display device according to claim 1, wherein
the inner plate further comprises a heat dissipation portion configured to form a third gap together with the display panel, and
the third gap is less than a thickness of the adhesive member.

6. The display device according to claim 1, wherein
the coupling area has a circular shape,
the conjunction portion comprises:
a first conjunction portion located at an upper side of the welding portion;
a second conjunction portion located at a left side of the welding portion; and
a third conjunction portion located at a right side of the welding portion, and
a distance between the second conjunction portion and the third conjunction portion is greater than a distance between the first conjunction portion and the second conjunction portion or a distance between the first conjunction portion and the third conjunction portion.

7. The display device according to claim 1, wherein
the coupling area has a circular shape,
the conjunction portion comprises:
a first conjunction portion located at an upper side of the welding portion;
a second conjunction portion located at a left upper side of the welding portion;
a third conjunction portion located at a left lower side of the welding portion;
a fourth conjunction portion located at a right lower side of the welding portion; and
a fifth conjunction portion located at a right upper side of the welding portion, a distance between the third conjunction portion and the fourth conjunction portion is greater than a distance between the first conjunction portion and the second conjunction portion or a distance between the fifth conjunction portion and the first conjunction portion,
the distance between the first conjunction portion and the second conjunction portion is greater than a distance between the second conjunction portion and the third conjunction portion, and
the distance between the fifth conjunction portion and the first conjunction portion is greater than a distance between the fourth conjunction portion and the fifth conjunction portion.

8. The display device according to claim 1, wherein
the coupling area has a circular shape,
the conjunction portion comprises a plurality of conjunction portions, and
the plurality of conjunction portions is irregularly distributed in the welding portion, the plurality of conjunction portions being distributed so as to spread long leftwards and rightwards.

9. The display device according to claim 1, wherein
the coupling area has a circular shape,
the conjunction portion comprises:
a first conjunction portion located at a left side of the welding portion; and
a second conjunction portion located at a right side of the welding portion, and
the first conjunction portion and the second conjunction portion are located so as to be spaced apart from each other in a leftward-rightward direction of the main frame, the first conjunction portion and the second conjunction portion being opposite each other with respect to the support portion.

\* \* \* \* \*